(12) United States Patent
Kusama et al.

(10) Patent No.: US 11,250,275 B2
(45) Date of Patent: Feb. 15, 2022

(54) INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Eiichi Kusama, Anjo (JP); Masatoshi Hayashi, Nisshin (JP); Hisanori Mitsumoto, Hadano (JP); Kuniaki Jinnai, Nagoya (JP); Makoto Akahane, Shinjuku-ku (JP); Yuriko Yamaguchi, Shibuya-ku (JP); Daisuke Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/675,553

(22) Filed: Nov. 6, 2019

(65) Prior Publication Data
US 2020/0193169 A1 Jun. 18, 2020

(30) Foreign Application Priority Data
Dec. 14, 2018 (JP) .............................. JP2018-234150

(51) Int. Cl.
*G06K 9/00* (2006.01)
*G06T 7/90* (2017.01)
*G01W 1/04* (2006.01)

(52) U.S. Cl.
CPC ........... *G06K 9/00791* (2013.01); *G01W 1/04* (2013.01); *G06T 7/90* (2017.01); *G06T 2207/30192* (2013.01); *G06T 2207/30252* (2013.01)

(58) Field of Classification Search
CPC .................. G06K 9/00791; G06T 7/90; G06T 2207/30192; G06T 2207/30252; G01W 1/04
See application file for complete search history.

(56) References Cited

U.S. PATENT DOCUMENTS

| | | | |
|---|---|---|---|
| 2014/0233805 A1* | 8/2014 | Faber | G06K 9/00825 382/104 |
| 2015/0168167 A1* | 6/2015 | Hwang | G01C 21/3691 701/522 |

(Continued)

FOREIGN PATENT DOCUMENTS

| | | | |
|---|---|---|---|
| JP | 2007-57331 A | | 3/2007 |
| KR | 20130129646 A | * | 11/2013 |
| KR | 20180051745 A | * | 5/2018 |

*Primary Examiner* — Vu Le
*Assistant Examiner* — Tracy Mangialaschi
(74) *Attorney, Agent, or Firm* — Oblon, McClelland, Maier & Neustadt, L.L.P.

(57) ABSTRACT

An information processing system is equipped with at least one vehicle and a server that can communicate with the at least one vehicle. The vehicle acquires an image obtained by imaging a landscape outside the vehicle, a humidity outside the vehicle, and an imaging position of the image. The vehicle or the server generates floating substance information on an atmospheric floating substance around the vehicle, based on the image and the humidity. The server stores at least one pair of the floating substance information and the imaging position corresponding thereto, and provides information to a client through the use of the at least one pair of the stored floating substance information and the stored imaging position corresponding thereto.

13 Claims, 9 Drawing Sheets

(56) References Cited

U.S. PATENT DOCUMENTS

2016/0318368 A1* 11/2016 Alger ................. G01C 21/3453
2017/0113512 A1* 4/2017 Park ................... G06K 9/00288

* cited by examiner

FIG. 3

| CONTRAST IS LOWER THAN FIRST REFERENCE VALUE | TINT IS REFERENCE COLOR | HUMIDITY IS EQUAL TO OR HIGHER THAN SECOND REFERENCE VALUE | ATMOSPHERIC FLOATING SUBSTANCE ||| 
|---|---|---|---|---|---|
| | | | WATER | POLLEN/ YELLOW DUST | OTHERS |
| YES | YES | YES | CONTAINED | CONTAINED | — |
| YES | YES | NO | — | CONTAINED | — |
| YES | NO | YES | CONTAINED | — | — |
| YES | NO | NO | CONTAINED | — | — |
| NO | YES | YES | — | — | — |
| NO | YES | NO | — | — | CONTAINED |
| NO | NO | YES | — | — | — |
| NO | NO | NO | — | — | — |

FIG. 5

| IMAGING TIME | IMAGING POSITION | FLOATING SUBSTANCE INFORMATION |
|---|---|---|

⋮

| IMAGING TIME | IMAGING POSITION | FLOATING SUBSTANCE INFORMATION | GENERATION SOURCE POSITION | GENERATION SOURCE TYPE |
|---|---|---|---|---|

⋮

INFORMATION PROCESSING SYSTEM, PROGRAM, AND INFORMATION PROCESSING METHOD

INCORPORATION BY REFERENCE

The disclosure of Japanese Patent Application No. 2018-234150 filed on Dec. 14, 2018 including the specification, drawings and abstract is incorporated herein by reference in its entirety.

BACKGROUND

1. Technical Field

The disclosure relates to an information processing system, a program, and an information processing method.

2. Description of Related Art

Conventionally, there is known an art of detecting a surrounding environment of a vehicle. In Japanese Patent Application Publication No. 2007-057331 (JP 2007-057331 A), for example, there is disclosed an in-vehicle fog determination device that makes a determination on the formation of a fog based on an image obtained by an in-vehicle camera through imaging.

SUMMARY

In an art described in Japanese Patent Application Publication No. 2007-057331 (JP 2007-057331 A), a determination on the formation of a fog is made based on a brightness of the image. However, the brightness of the image is affected by the presence of a substance other than water existing in the atmosphere, for example, pollen, yellow dust or the like, as well as the formation of a fog. In the conventional art, therefore, it may be erroneously detected that there is a fog, even when pollen or the like floats in the atmosphere. Accordingly, there is room for improvement in the art of detecting the surrounding environment of the vehicle.

It is an object of the disclosure, which has been made in view of the foregoing circumstances, to improve the art of detecting the surrounding environment of the vehicle.

An information processing system according to one embodiment of the disclosure is an information processing system that is equipped with at least one vehicle and a server that can communicate with the at least one vehicle. The vehicle acquires an image obtained by imaging a landscape outside the vehicle, a humidity outside the vehicle, and an imaging position of the image. The vehicle or the server generates floating substance information on an atmospheric floating substance around the vehicle, based on the image and the humidity. The server stores at least one pair of the floating substance information and the imaging position corresponding thereto, and provides information to a client through use of the at least one pair of the stored floating substance information and the stored imaging position corresponding thereto.

A program according to one embodiment of the disclosure causes an information processing device that is mounted in a vehicle to carry out a step of acquiring an image obtained by imaging a landscape outside the vehicle, a humidity outside the vehicle, and an imaging position of the image, a step of generating floating substance information on an atmospheric floating substance around the vehicle, based on the image and the humidity, and a step of transmitting the floating substance information and the imaging position to a server.

A program according to one embodiment of the disclosure causes an information processing device that can communicate with at least one vehicle to carry out a step of receiving, from the vehicle, an image obtained by imaging a landscape outside the vehicle, a humidity outside the vehicle, and an imaging position of the image, a step of generating floating substance information on an atmospheric floating substance around the vehicle, based on the image and the humidity, a step of storing at least one pair of the floating substance information and the imaging position corresponding thereto, and a step of providing information to a client through use of the at least one pair of the stored floating substance information and the stored imaging position corresponding thereto.

An information processing method according to one embodiment of the disclosure is an information processing method that is carried out by an information processing device that is equipped with at least one vehicle and a server that can communicate with the at least one vehicle. The information processing method includes a step in which the vehicle acquires an image obtained by imaging a landscape outside the vehicle, a humidity outside the vehicle, and an imaging position of the image, a step in which the vehicle or the server generates floating substance information on an atmospheric floating substance around the vehicle, based on the image and the humidity, a step in which the server stores at least one pair of the floating substance information and the imaging position corresponding thereto, and a step of providing information to a client through use of the at least one pair of the stored floating substance information and the stored imaging position corresponding thereto.

The information processing system, the programs, and the information processing method according to the embodiment of the disclosure improve the art of detecting a surrounding environment of a vehicle.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 3 is a view illustrating floating substance information on an atmospheric floating sub stance;

FIG. 5 is a view showing an example of information stored in the server;

DETAILED DESCRIPTION OF EMBODIMENT

The embodiment of the disclosure will be described hereinafter.

First Embodiment

Figure 1:
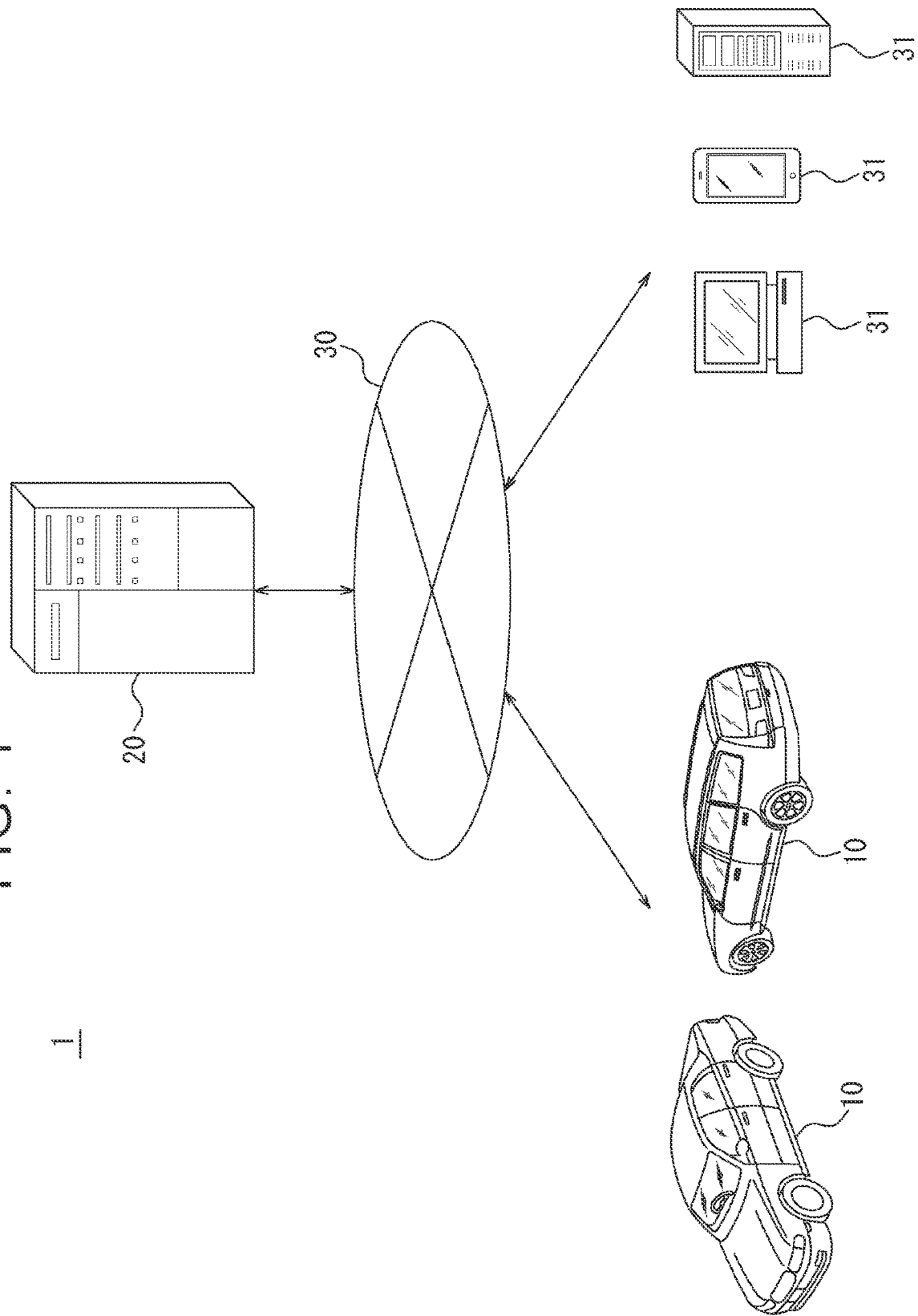
FIG. 1 is a view showing the schematic configuration of an information processing system according to the embodiment of the disclosure.

The outline of an information processing system 1 according to one embodiment of the disclosure will be described with reference to FIG. 1. The information processing system 1 is equipped with one or more vehicles 10 and a server 20. The vehicles 10 are, for example, automobiles, but should not be limited thereto. The vehicles 10 may be any types of vehicles. For the sake of simplified explanation, only the two vehicles 10 are shown in FIG. 1, but the information processing system 1 may be equipped with any number of vehicles 10. The server 20 includes a single or a plurality of information processing devices (e.g., server devices) that can communicate with one another. The vehicles 10 can communicate with the server 20 via a network 30 including, for example, a mobile communications network, the Internet and the like. Besides, the server 20 can communicate with a client 31 via the network 30. The client 31 is, for example, a personal computer (PC), a smartphone, a server device or the like, but may be any type of information processing device.

First of all, the outline of the present embodiment will be described, and the details thereof will be described later. Each of the vehicles 10 is equipped with, for example, an in-vehicle camera, a humidity sensor, and a receiver corresponding to a satellite positioning system, and acquires an image obtained by imaging a landscape outside the vehicle, and a humidity outside the vehicle and a position of the own vehicle (an imaging position) at the time when the image is obtained through imaging. The vehicle 10 generates floating substance information on an atmospheric floating substance (e.g., water, pollen, yellow dust, or the like) around the own vehicle, based on the image and the humidity. The server 20 stores at least one pair of the floating substance information and the imaging position corresponding thereto, by collecting information from the at least one vehicle 10. The server 20 provides information to the client 31 through the use of the stored information.

Thus, according to the present embodiment, in order to generate the floating substance information, the humidity outside the vehicle is taken into account in addition to the image obtained by imaging the landscape outside the vehicle 10. As will be described later, a situation where there is a fog (i.e., a situation where the atmospheric floating substance contains water) and a situation where a substance that is different from water floats in the atmosphere (i.e., a situation where the atmospheric floating substance contains a substance that is different from water) can be detected separately from each other, by taking both the image and the humidity into account. Therefore, the detection accuracy of the art of detecting the surrounding environment of the vehicle is improved. Besides, according to the present embodiment, the client 31 is provided with information, through the use of the at least one pair of the floating substance information and the imaging position corresponding thereto, which have been collected by the server 20. Therefore, the client 31 can recognize, for example, a position where there is actually a fog, and the like. Accordingly, the convenience of the art of detecting the surrounding environment of the vehicle is improved.

Next, respective components of the information processing system 1 will be described in detail.

(Configuration of Vehicle)

Figure 2:
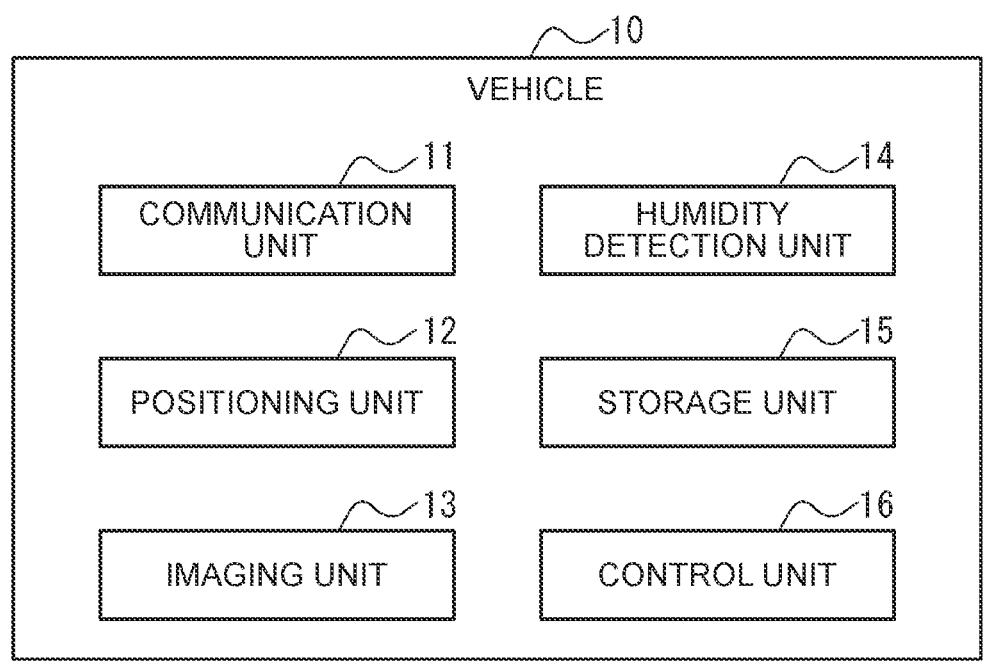
FIG. 2 is a block diagram showing the schematic configuration of a vehicle.

As shown in FIG. 2, the vehicle 10 is equipped with a communication unit 11, a positioning unit 12, an imaging unit 13, a humidity detection unit 14, a storage unit 15, and a control unit 16. Each of the communication unit 11, the positioning unit 12, the imaging unit 13, the humidity detection unit 14, the storage unit 15, and the control unit 16 may be built into the vehicle 10, or may be removably provided in the vehicle 10. The communication unit 11, the positioning unit 12, the imaging unit 13, the storage unit 15, and the control unit 16 are connected to one another in such a manner as to be able to communicate with one another via, for example, an in-vehicle network such as a controller area network (CAN) or the like or a leased line.

The communication unit 11 includes a communication module that is connected to the network 30. The communication module corresponds to, for example, a mobile communication standard such as 4th Generation (4G), 5th Generation (5G) or the like, but should not be limited thereto. The communication module may correspond to any communication standard. For example, an in-vehicle communication instrument such as a data communication module (DCM) or the like may function as the communication unit 11. In the present embodiment, the vehicle 10 is connected to the network 30 via the communication unit 11.

The positioning unit 12 includes a receiver corresponding to a satellite positioning system. The receiver corresponds to, for example, a global positioning system (GPS), but should not be limited thereto. The receiver may correspond to any satellite positioning system. Besides, the positioning unit 12 includes, for example, a gyro sensor and a geomagnetic sensor. For example, a car navigation device may function as the positioning unit 12. In the present embodiment, the vehicle 10 acquires a position of the own vehicle and a direction of the own vehicle through the use of the positioning unit 12.

The imaging unit 13 includes an in-vehicle camera that generates an image obtained by imaging a photographic subject within a visual field. The image may be a static image or a dynamic image. The in-vehicle camera may be a monocular camera or a stereo camera. The imaging unit 13 is provided in the vehicle 10 such that a landscape outside the vehicle can be imaged. For example, a drive recorder or an electronic instrument functioning as a camera such as a smartphone used by a passenger, or the like may function as the imaging unit 13. In the present embodiment, the vehicle 10 acquires the image obtained by imaging the landscape outside the vehicle, through the use of the imaging unit 13.

The humidity detection unit 14 includes a humidity sensor that detects a humidity. The humidity detection unit 14 is provided in the vehicle 10 such that the humidity outside the vehicle can be detected. In the present embodiment, the vehicle 10 acquires the humidity outside the vehicle through the use of the humidity detection unit 14.

The storage unit 15 includes at least one memory. In the present embodiment, "the memory" is, for example, a semiconductor memory, a magnetic memory, an optical memory or the like, but should not be limited thereto. Each memory that is included in the storage unit 15 may function as, for example, a main storage device, an auxiliary storage device, or a cash memory. The storage unit 15 stores any type of information that is used for the operation of the vehicle 10. For example, the storage unit 15 may store a system program, an application program, an embedded piece of software, and the like. The information stored in the storage unit 15 may be updatable by, for example, information that is acquired from the network 30 via the communication unit 11.

The control unit 16 is equipped with at least one processor. In the present embodiment, "the processor" is a general-purpose processor, a dedicated processor specially designed for specific processing, or the like, but should not be limited thereto. For example, an electronic control unit (ECU) mounted in the vehicle 10 may function as the control unit 16. The control unit 16 functions as a timer for grasping a present time. The control unit 16 controls the operation of the entire vehicle 10.

For example, the control unit 16 acquires an image obtained by imaging a landscape outside the vehicle, through the use of the imaging unit 13. The control unit 16 acquires a humidity outside the vehicle, a time (hereinafter referred to also as an imaging time of the image), and a position of the own vehicle (hereinafter referred to also as an imaging position of the image) upon the imaging of the image, through the use of the positioning unit 12 and the humidity detection unit 14.

Besides, the control unit 16 generates floating substance information on an atmospheric floating substance around the vehicle 10, based on the acquired image and the acquired humidity. This will be described hereinafter concretely.

First of all, a method of determining whether or not there is an atmospheric floating substance around the vehicle 10 will be described. When there is some substance floating in the atmosphere around the vehicle 10, the contrast of the obtained image falls. Accordingly, it can be determined, based on the contrast of the image, whether or not there is an atmospheric floating substance around the vehicle 10. Incidentally, "the contrast" is, for example, a Michelson contrast (a ratio of a difference from the sum of a maximum brightness and a minimum brightness in the image), but should not be limited thereto. "The contrast" may be quantified according to any method.

The control unit 16 determines whether or not there is an atmospheric floating substance around the vehicle 10, by determining whether or not the contrast of the image is equal to or higher than a first reference value. The first reference value may be determined based on a result of, for example, an experiment or a simulation in which the image in the case where there is an atmospheric floating substance and the image in the case where there is no atmospheric floating substance are compared with each other. If it is determined that the contrast of the image is equal to or higher than the first reference value, the control unit 16 determines that there is no atmospheric floating substance around the vehicle 10. On the other hand, if it is determined that the contrast of the image is lower than the first reference value, the control unit 16 determines that there is an atmospheric floating substance around the vehicle 10.

Next, a method of determining whether or not the atmospheric floating substance around the vehicle 10 contains pollen or yellow dust will be described. When pollen or yellow dust floats in the atmosphere, the tint of the obtained image can be affected. More specifically, the tint of a background region of the obtained image where, for example, the sky, a photographic subject in the distance, and the like are visible is more likely to turn yellow. Accordingly, it can be determined, based on the tint of the image, whether or not the atmospheric floating substance around the vehicle 10 contains pollen or yellow dust.

If it is determined that the contrast of the image is lower than the first reference value as described above (i.e., if it is determined that there is an atmospheric floating substance around the vehicle 10), the control unit 16 determines whether or not the atmospheric floating substance around the vehicle 10 contains pollen or yellow dust, by further determining whether or not the tint of the image is a reference color. In the present embodiment, the reference color is a yellowish color, and is quantified as, for example, 50 to 70 degrees in a color circle, but should not be limited thereto. The reference color may be quantified according to any method.

In concrete terms, the control unit 16 determines whether or not the tint of the entirety or the background region of the image is the reference color. For example, if the ratio of the number of pixels of the reference color to the number of all pixels in the entirety or the background region of the image in a hue histogram is equal to or larger than a predetermined value, the control unit 16 determines that the tint of the image is the reference color. On the other hand, if the ratio is smaller than the predetermined value, the control unit 16 determines that the tint of the image is different from the reference color. However, the method using the hue histogram is not indispensable in determining whether or not the tint of the image is the reference color, but any method can be adopted. Incidentally, the background region on the image may be detected through image recognition. Alternatively, in the case where the in-vehicle camera included in the imaging unit 13 is fixed to the vehicle 10, the region on the image reflecting the sky may be determined in advance as the background region. If it is determined that the tint of the image is the reference color, the control unit 16 determines that the atmospheric floating substance around the vehicle 10 contains pollen or yellow dust. On the other hand, if it is determined that the tint of the image is different from the reference color, the control unit 16 may determine that the atmospheric floating substance around the vehicle 10 does not contain pollen or yellow dust.

Next, a method of determining whether or not the atmospheric floating substance around the vehicle 10 contains water will be described. A condition for the formation of a fog includes that the humidity is 100%. Besides, the formed fog can move to the periphery of a spot of the formation of the fog by, for example, being carried by the flow of air, but the remaining time of the fog lengthens as the humidity rises. Therefore, the humidity of the spot where the fog is observed is usually relatively high. Accordingly, it can be determined, based on the humidity, whether or not the atmospheric floating substance around the vehicle 10 contains water.

If it is determined that the contrast of the image is lower than the first reference value as described above (i.e., if it is determined that there is an atmospheric floating substance around the vehicle 10), the control unit 16 determines whether or not the atmospheric floating substance around the vehicle 10 contains water, by determining whether or not the humidity outside the vehicle is equal to or higher than a second reference value. The second reference value is arbitrarily determined within a range, for example, equal to or higher than 90% and equal to or lower than 100%, but should not be limited thereto. The second reference value may be determined based on a result of an experiment or a simulation.

FIG. 3 is a view illustrating the floating substance information that can be generated according to the above-mentioned method. As indicated at line 1 of FIG. 3, when the contrast of the image is lower than the first reference value, the tint of the image is the reference color, and the humidity is equal to or higher than the second reference value, the control unit 16 generates floating substance information indicating that the atmospheric floating substance around the vehicle 10 contains water and pollen or yellow dust. Besides, as indicated at line 2, when the contrast of the image is lower than the first reference value, the tint of the image is the reference color, and the humidity is lower than the second reference value, the control unit 16 generates floating substance information indicating that the atmospheric floating substance around the vehicle 10 contains pollen or yellow dust. Besides, as indicated at line 3, when the contrast of the image is lower than the first reference value, the tint of the image is different from the reference color, and the humidity is equal to or higher than the second reference value, the control unit 16 generates floating substance information indicating that the atmospheric floating substance around the vehicle 10 contains water. Besides, as indicated at line 4, when the contrast of the image is lower than the first reference value, the tint of the image is different from the reference color, and the humidity is lower than the second reference value, the control unit 16 generates floating substance information indicating that the atmospheric floating substance around the vehicle 10 contains another substance that is different from any of water, pollen, and yellow dust. Besides, as indicated at lines 5 to 8, when the contrast of the image is equal to or higher than the first reference value, the control unit 16 generates floating substance information indicating that there is no atmospheric floating substance around the vehicle 10.

Besides, the image may reflect a generation source of the atmospheric floating substance, for example, a plant such as cedar, Japanese cypress or the like, a factory having a chimney, or the like. Upon detecting the generation source of the atmospheric floating substance from the image, the control unit 16 acquires a type of the generation source (hereinafter referred to also as a generation source type) and a position of the generation source (hereinafter referred to also as a generation source position) based on an imaging position of the image and the image. Incidentally, any image recognition method, for example, pattern matching, characteristic point extraction, machine learning or the like can be adopted in detecting the generation source.

It should be noted herein that the generation source type may be indicated by, for example, a generated substance. For example, the plant such as cedar, Japanese cypress or the like can be detected as a generation source whose type is "pollen". Besides, for example, the factory having the chimney or the like can be detected as a generation source whose type is "another substance" that is different from any of water, pollen, and yellow dust. For example, the generation source type can be acquired by storing information on the generated substance into the storage unit 15 in advance for each generation source that can be detected from the image.

Besides, the generation source position can be acquired based on, for example, a position of the position of the own vehicle (i.e., an imaging position of the image) and a relative position between the own vehicle and the generation source. The relative position can be detected based on, for example, a distance from the own vehicle to the generation source and a direction of the generation source as viewed from the own vehicle. The distance from the own vehicle to the generation source can be detected according to any ranging method using an image, for example, a motion stereo method using a monocular camera image, a stereo method using a stereo camera image, or the like. The direction of the generation source as viewed from the own vehicle can be detected based on a direction of the in-vehicle camera of the imaging unit 13, and a position of the generation source on the image.

Then, the control unit 16 transmits the above-mentioned floating substance information, and the imaging time and position corresponding thereto to the server 20 via the communication unit 11. When the generation source of the atmospheric floating substance is detected from the image as described above, the control unit 16 further transmits the generation source type and the generation source position. The floating substance information, the imaging time, the imaging position, the generation source type, and the generation source position, which are transmitted from the vehicle 10 to the server 20, will be comprehensively referred to hereinafter also as "floating substance information and the like".

(Configuration of Server)

Figure 4:
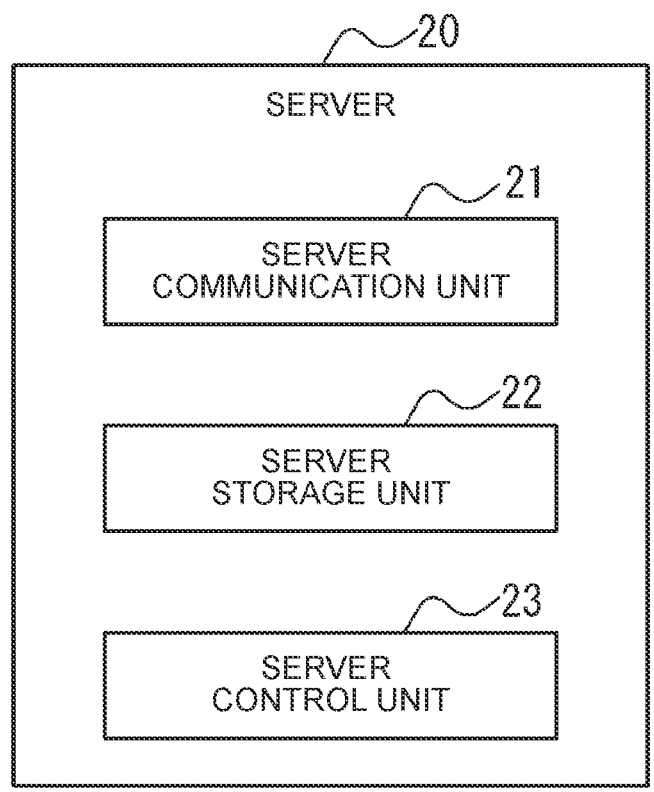
FIG. 4 is a block diagram showing the schematic configuration of a server.

As shown in FIG. 4, the server 20 is equipped with a server communication unit 21, a server storage unit 22, and a server control unit 23.

The server communication unit 21 includes a communication module that is connected to the network 30. The communication module corresponds to, for example, a local area network (LAN) standard, but should not be limited thereto. The communication module may correspond to any communication standard. In the present embodiment, the server 20 is connected to the network 30 via the server communication unit 21.

The server storage unit 22 includes at least one memory. Each memory that is included in the server storage unit 22 may function as, for example, a main storage device, an auxiliary storage device, or a cash memory. The server storage unit 22 stores any piece of information that is used for the operation of the server 20. For example, the server storage unit 22 may store a system program, an application program, a database, map information, and the like. The information stored in the server storage unit 22 may be updatable by, for example, information that is acquired from the network 30 via the server communication unit 21.

The server control unit 23 includes at least one processor. The server control unit 23 functions as a timer for grasping a present time. The server control unit 23 controls the operation of the entire server 20.

For example, upon receiving the floating substance information and the like from the vehicle 10 via the server communication unit 21, the server control unit 23 stores the floating substance information and the like into the database of the server storage unit 22. It should be noted herein that a single or a plurality of pieces of floating substance information and the like can be received from the single vehicle 10 or a plurality of the vehicles 10. Accordingly, the server control unit 23 stores the at least one piece of floating substance information and the like received from the at least one vehicle 10 into the database of the server storage unit 22. FIG. 5 is a view schematically showing the information that is stored into the database. An upper stage of FIG. 5 indicates the imaging time, the imaging position, and the floating substance information as to an image where the generation source of the atmospheric floating substance has not been detected. A lower stage in FIG. 5 indicates the imaging time, the imaging position, the floating substance information, the generation source position, and the generation source type as to an image where the generation source of the atmospheric floating substance has been detected.

Besides, the server control unit 23 provides information to the client 31 through the use of the at least one piece of floating substance information and the like stored in the server storage unit 22. Besides, as will be described later, the server control unit 23 may acquire a wind direction and a wind speed at each generation source from the network 30 via the server communication unit 21. In this case, the server control unit 23 provides information to the client 31 through the use of the wind direction and wind speed at each generation source as well as the at least one piece of floating substance information and the like stored in the server storage unit 22. The provision of information may be carried out, for example, upon a request from the client 31 (e.g., pull-type distribution), or may be automatically carried out by the server control unit 23 (e.g., push-type distribution). The provision of information may be carried out through a web application stored in the server storage unit 22. The provision of information that is carried out through the use of the floating substance information and the like may include directly providing the floating substance information and the like, or may include providing any type of information that is newly generated through the use of the floating substance information and the like.

Figure 6:
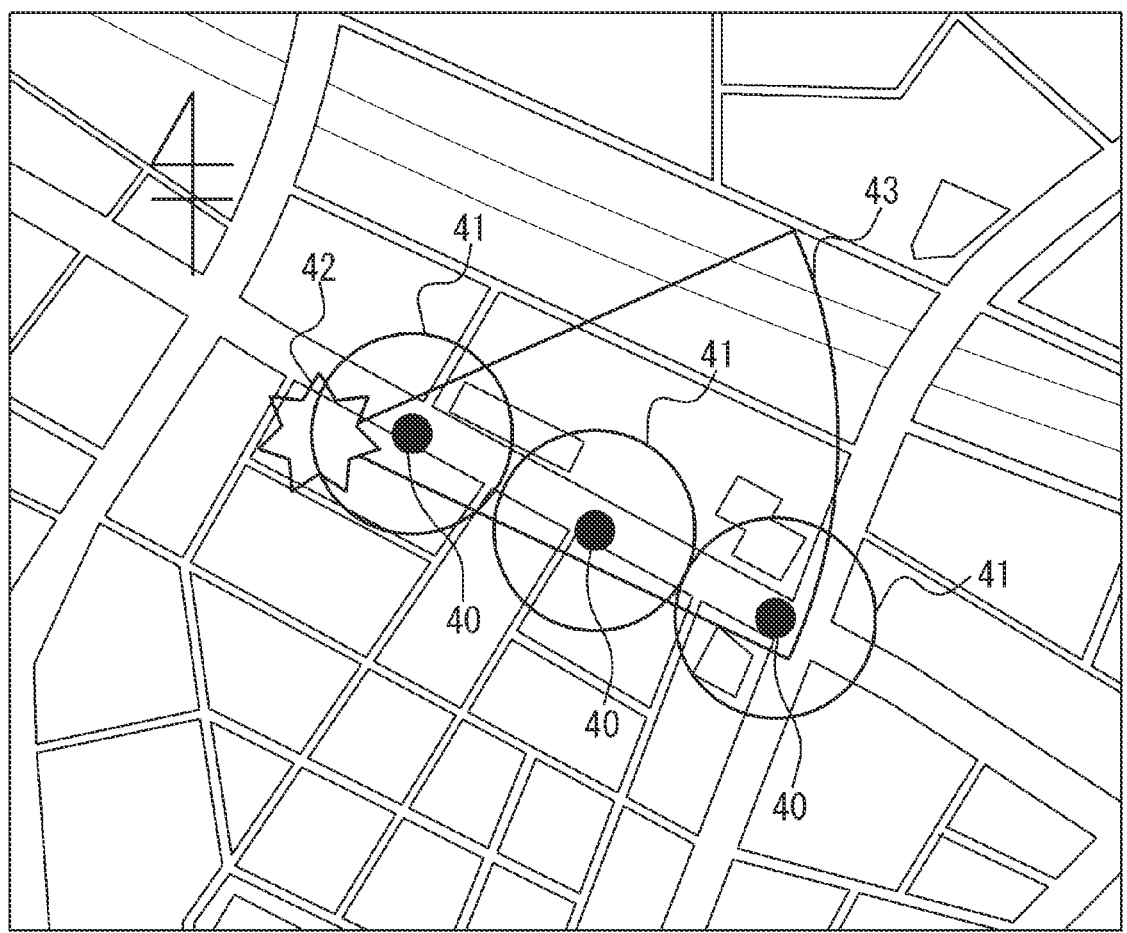
FIG. 6 is a view showing an example of information provided from the server to a client.

For example, FIG. 6 shows an example of an image displayed at the client 31 based on the information that is provided from the server 20. Three imaging positions 40, floating substance presence areas 41 as circular areas around the respective imaging positions 40, a generation source position 42, and a floating substance presence area 43 as a sectoral area spreading toward the east around the generation source position 42 are displayed on a map in the image shown in FIG. 6. A user of the client 31 can grasp at a glance a geographical area where there is an atmospheric floating substance, by visually recognizing the image shown in FIG. 6. Incidentally, the server control unit 23 may arbitrarily determine the shape and size of the floating substance presence areas 41. Besides, the server control unit 23 may acquire a wind direction and a wind speed at the generation source position 42, for example, from the network 30 via the server communication unit 21, and determine the shape and size of a floating substance presence area 43, based on the wind direction and the wind speed. Besides, for example, when the imaging positions 40 or the floating substance presence areas 41 on the image are selected by the user, the corresponding floating substance information may be displayed. By the same token, for example, when the generation source position 42 or the floating substance presence area 43 on the image is selected by the user, the corresponding generation source type may be displayed.

(Operation Flow of Vehicle)

Figure 7:
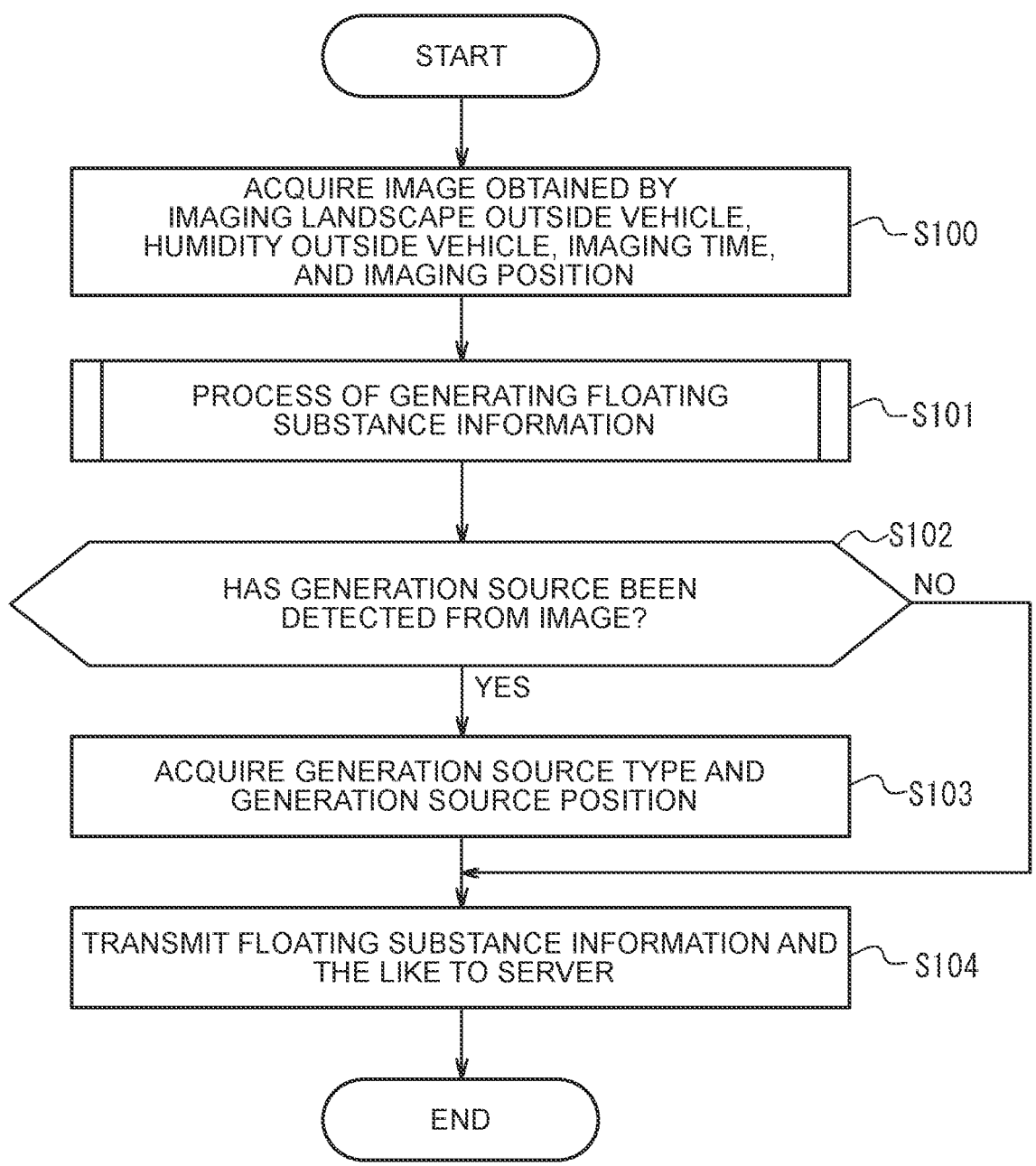
FIG. 7 is a flowchart showing the operation of the vehicle.

The operation flow of the vehicle 10 will be described with reference to FIG. 7.

In step S100, the control unit 16 acquires an image obtained by imaging a landscape outside the vehicle, a humidity outside the vehicle, an imaging time, and an imaging position.

In step S101, the control unit 16 performs a process of generating floating substance information on an atmospheric floating substance around the vehicle 10, based on the image and the humidity. The floating substance information is generated by the process. A concrete example of the process will be described later with reference to FIG. 8.

In step S102, the control unit 16 determines whether or not a generation source of a substance that can float in the atmosphere has been detected from the image. If it is determined that no generation source has been detected (No in step S102), the process proceeds to step S104. On the other hand, if it is determined that a generation source has been detected (Yes in step S102), the process proceeds to step S103.

In step S103, the control unit 16 acquires a generation source type and a generation source position, based on the imaging position of the image and the image.

In step S104, the control unit 16 transmits the floating substance information, the imaging time, the imaging position, the generation source type, and the generation source position to the server 20 via the communication unit 11.

Figure 8:
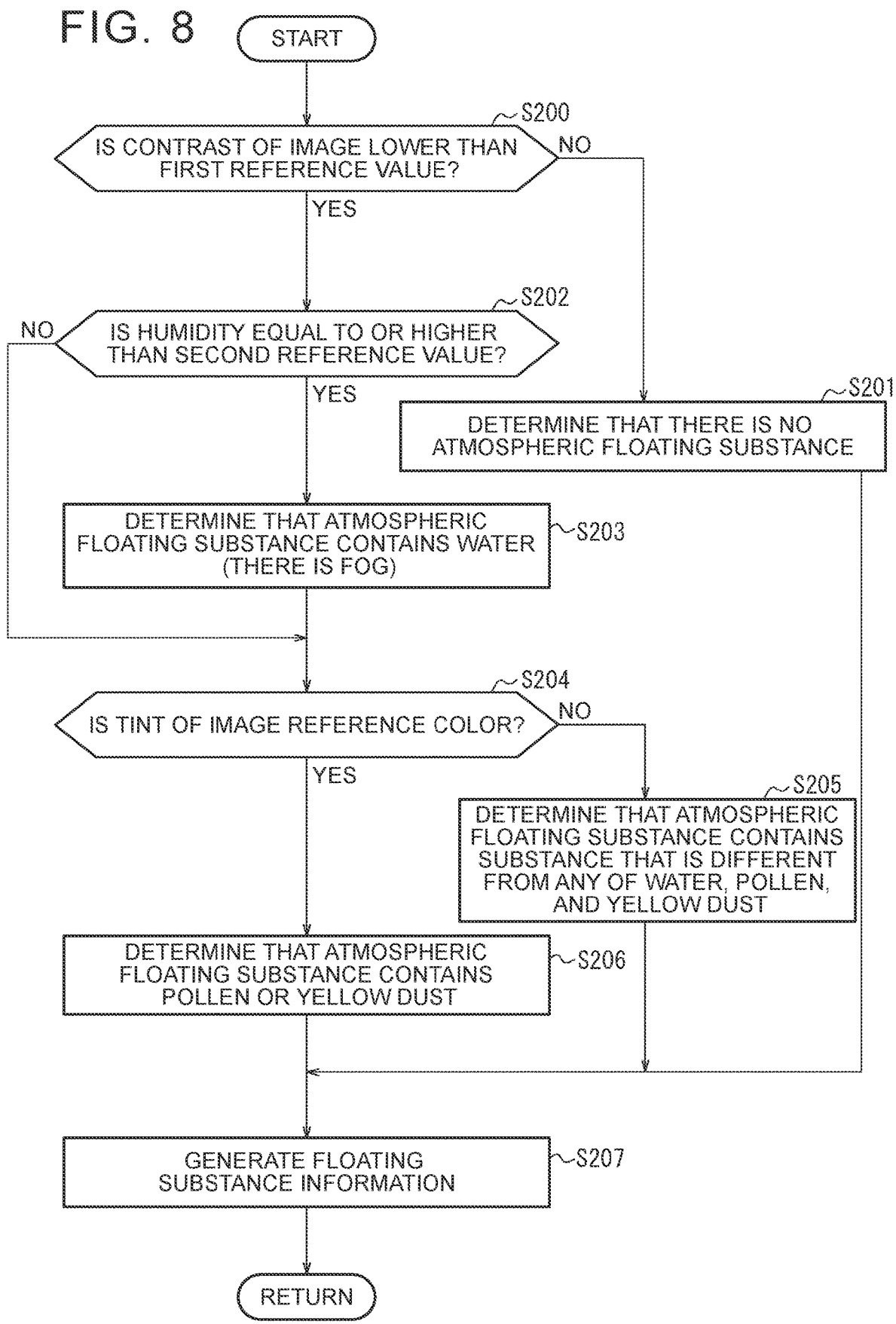
FIG. 8 is a flowchart showing an example of processing contents described in FIG. 7.

The above-mentioned process of generating the floating substance information (step S101) will be concretely described with reference to FIG. 8.

In step S200, the control unit 16 determines whether or not the contrast of the image is lower than the first reference value. If it is determined that the contrast of the image is lower than the first reference value (Yes in step S200), the process proceeds to step S202. On the other hand, if it is determined that the contrast of the image is equal to or higher than the first reference value (No in step S200), the process proceeds to step S201.

In step S201, the control unit 16 determines that there is no atmospheric floating substance around the vehicle 10. After that, the process proceeds to step S207.

In step S202, the control unit 16 determines whether or not the humidity is equal to or higher than the second reference value. If it is determined that the humidity is lower than the second reference value (No in step S202), the process proceeds to step S204. On the other hand, if it is determined that the humidity is equal to or higher than the second reference value (Yes in step S202), the process proceeds to step S203.

In step S203, the control unit 16 determines that the atmospheric floating substance around the vehicle 10 contains water (there is a fog).

In step S204, the control unit 16 determines whether or not the tint of the image is the reference color. If it is determined that the tint of the image is different from the reference color (No in step S204), the process proceeds to step S205. On the other hand, if it is determined that the tint of the image is the reference color (Yes in step S204), the process proceeds to step S206.

In step S205, the control unit 16 determines that the atmospheric floating substance around the vehicle 10 contains another substance that is different from any of water, pollen, and yellow dust. After that, the process proceeds to step S207.

In step S206, the control unit 16 determines that the atmospheric floating substance around the vehicle 10 contains pollen or yellow dust.

In step S207, the control unit 16 generates floating substance information on the atmospheric floating substance around the vehicle 10, based on a result of the determination in step S201, S205, or S206. After that, the process proceeds to the above-mentioned step S102.

(Operation Flow of Server)

Figure 9:
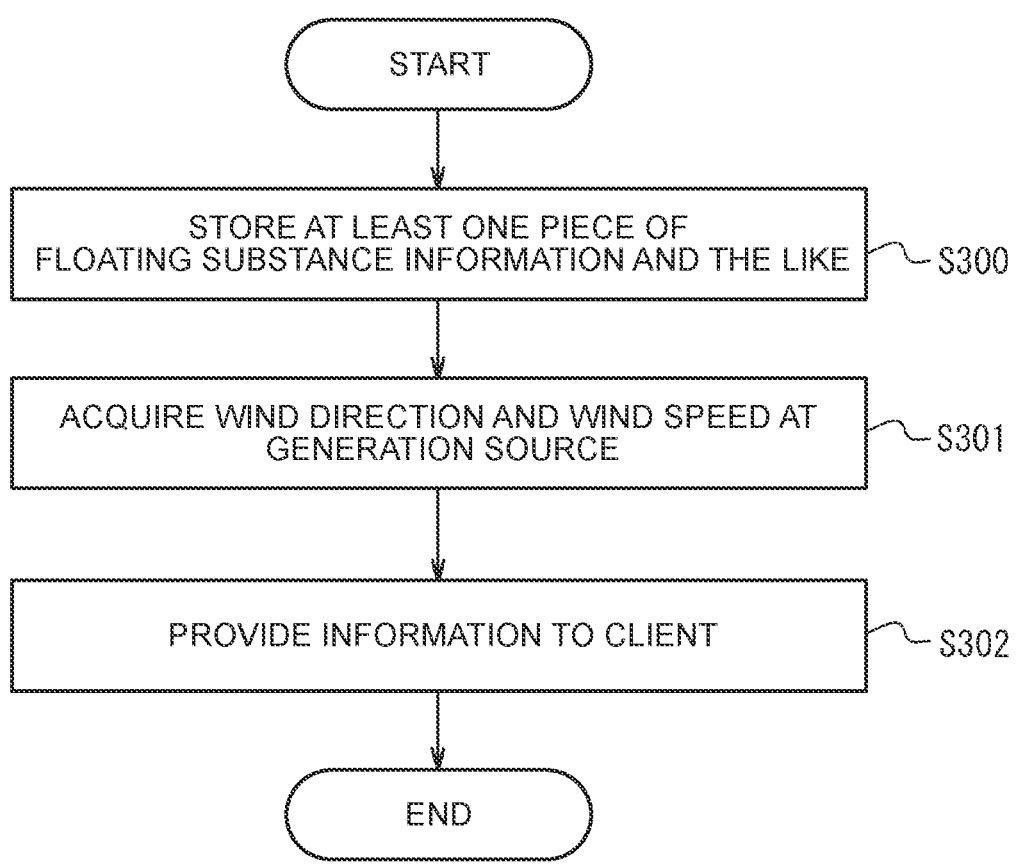
FIG. 9 is a flowchart showing the operation of the server.

The operation flow of the server 20 will be described with reference to FIG. 9.

In step S300, the server control unit 23 stores the at least one piece of floating substance information and the like received from the at least one vehicle 10 into the database of the server storage unit 22. It should be noted herein that the following description will be given on the assumption that the generation source position and the generation source type as to the at least one generation source are stored in the database.

In step S301, the server control unit 23 acquires a wind direction and a wind speed at each generation source, from the network 30 via the server communication unit 21.

In step S302, the server control unit 23 provides information to the client 31, through the use of the at least one piece of floating substance information and the like stored in the server storage unit 22, and the wind direction and the wind speed at each generation source.

As described above, in the information processing system 1 according to the present embodiment, the vehicle 10 acquires the image obtained by imaging the landscape outside the vehicle, the humidity outside the vehicle, and the imaging position of the image. The vehicle 10 generates the floating substance information on the atmospheric floating substance around the vehicle 10, based on the image and the humidity. The server 20 stores at least one pair of the floating substance information and the imaging position corresponding thereto. The server 20 provides information to the client 31 through the use of the at least one pair of the stored floating substance information and the stored imaging position corresponding thereto.

According to this configuration, the humidity outside the vehicle 10 is taken into account in addition to the image obtained by imaging the landscape outside the vehicle. Therefore, a situation where there is a fog (i.e., a situation where the atmospheric floating substance contains water) and a situation where a substance that is different from water floats in the atmosphere (i.e., a situation where the atmospheric floating substance contains a substance that is different from water) can be detected separately from each other. Therefore, the detection accuracy of the art of detecting the surrounding environment of the vehicle is improved. Besides, according to the present embodiment, the client 31 is provided with information, through the use of the at least one pair of the floating substance information and the imaging position corresponding thereto, which have been collected by the server 20. Therefore, the client 31 can recognize, for example, a position where there is actually a fog, and the like. Accordingly, the convenience of the art of detecting the surrounding environment of the vehicle is improved.

Although the disclosure has been described based on the various drawings and the embodiment, it should be noted that those skilled in the art can easily make various modifications and corrections based on the present disclosure. Accordingly, it should be noted that these modifications and corrections fall within the scope of the disclosure. For example, the functions included in the respective means or the respective steps, and the like can be rearranged such that no logical contradiction occurs. The plurality of the means, the steps or the like can be combined into one or divided.

For example, in the above-mentioned embodiment, part of the processing operation that is performed in the vehicle 10 may be performed in the server 20, and part of the processing operation that is performed in the server 20 may be performed in the vehicle 10. For example, it is also possible to adopt a configuration in which the process of generating the floating substance information, the process of detecting the generation source from the image, the process of acquiring the generation source position and the generation source type, and the like are performed by the server 20 instead of the vehicle 10. Besides, for example, it is also possible to adopt a configuration in which the process of acquiring the wind direction and the wind speed at the generation source, and the like are performed by the vehicle 10 instead of the server 20.

Besides, in the above-mentioned embodiment, the configuration in which the floating substance information indicating that the atmospheric floating substance around the vehicle 10 contains water and the like is generated has been described. However, the floating substance information may further include any type of information regarding the atmospheric floating substance around the vehicle 10. For example, the control unit 16 may determine that the amount of the atmospheric floating substance around the vehicle 10 increases (i.e., the visibility deteriorates) as the contrast of the image falls. In this case, the control unit 16 may generate floating substance information indicating that the atmospheric floating substance around the vehicle 10 contains water and the like, and the amount of the atmospheric floating substance.

Besides, in the above-mentioned embodiment, the example in which the reference color that is used to be compared with the tint of the image is yellowish has been described. However, the reference color should not necessarily be yellowish. For example, the tint of the image is also affected by an imaging condition, for example, the time zone, the weather, the amount of insolation, or the like. That is, when pollen or yellow dust floats in the atmosphere, the tint of the obtained image can become a color other than yellow, depending on the imaging condition. Therefore, the control unit 16 of the vehicle 10 may dynamically change the reference color in accordance with the imaging condition. For example, it is possible to adopt a configuration in which the control unit 16 stores information indicating a corresponding relationship between the imaging condition and the reference color into the storage unit 15 in advance, the reference color corresponding to the imaging condition in obtaining the image through imaging is determined from the information, and it is determined whether or not the tint of the image is the reference color. Incidentally, the corresponding relationship between the imaging condition and the reference color can be determined based on a result of an experiment or a simulation that uses a plurality of images obtained through imaging with the imaging condition changed in a situation where, for example, pollen or yellow dust floats in the atmosphere.

Besides, in the above-mentioned embodiment, the configuration in which the control unit 16 generates the floating substance information indicating that the atmospheric floating substance around the vehicle 10 contains water and pollen or yellow dust when the contrast of the image is lower than the first reference value, the tint of the image is the reference color, and the humidity outside the vehicle is equal to or higher than the second reference value as indicated at line 1 of FIG. 3 has been described. However, it is also possible to adopt a configuration in which the control unit 16 generates floating substance information indicating that the atmospheric floating substance contains one of water and pollen or yellow dust in the above-mentioned case. For example, when the atmospheric floating substance contains water (i.e., there is a fog), the control unit 16 may determine that the atmospheric floating substance contains water (does not contain pollen or yellow dust) in the above-mentioned case, on the assumption that pollen or yellow dust does not float in the atmosphere. On the contrary, when the atmospheric floating substance contains pollen or yellow dust, the control unit 16 may determine that the atmospheric floating substance contains pollen or yellow dust (does not contain water) in the above-mentioned case, on the assumption that water does not float in the atmosphere.

Besides, it is also possible to adopt a configuration in which a general-purpose information processing device, for example, a smart phone, a computer or the like is caused to function as a component part with which the vehicle 10 according to the above-mentioned embodiment is equipped, or as the server 20. In concrete terms, a program describing the processing contents for realizing the respective functions in the vehicle 10, the server 20 or the like according to the embodiment is stored into the memory of the information processing device, and this program is read out and executed by the processor of the information processing device. Accordingly, the disclosure according to the present embodiment can also be realized as a program that can be executed by a processor.

What is claimed is:

1. An information processing system comprising:
   at least one vehicles; and
   a server configured to communicate with the at least one vehicle, wherein
   the at least one vehicle acquires an image obtained by imaging a landscape outside the at least one vehicle, a humidity outside the at least one vehicle, and an imaging position of the image,
   the at least one vehicle or the server generates, based on the image and the humidity, floating substance information on an atmospheric floating substance around the at least one vehicle,
   the server stores at least one pair of the floating substance information and the imaging position corresponding thereto, and provides display information to a client, the display information including the at least one pair of the stored floating substance information and the stored imaging position corresponding thereto, and
   a floating substance presence area, based on the display information that includes the floating substance information and the imaging position, is superimposed and displayed on a map.

2. The information processing system according to claim 1, wherein
   the at least one vehicle or the server generates the floating substance information indicating that the atmospheric floating substance around the at least one vehicle contains a substance that is different from any of water, pollen, and yellow dust, when a contrast of the image is lower than a first reference value, a tint of the image is different from a reference color, and the humidity is lower than a second reference value.

3. The information processing system according to claim 2, wherein
   the at least one vehicle or the server generates the floating substance information indicating that the atmospheric floating substance around the at least one vehicle contains water, when the contrast of the image is lower than the first reference value and the humidity is equal to or higher than the second reference value.

4. The information processing system according to claim 2, wherein
   the at least one vehicle or the server generates the floating substance information indicating that the atmospheric floating substance around the at least one vehicle contains pollen or yellow dust, when the contrast of the image is lower than the first reference value and the tint of the image is the reference color.

5. The information processing system according to claim 2, wherein
   the at least one vehicle or the server generates the floating substance information indicating that there is no atmospheric floating substance around the at least one vehicle, when the contrast of the image is equal to or higher than the first reference value.

6. The information processing system according to claim 1, wherein
   the at least one vehicle or the server acquires a position of a generation source of the atmospheric floating substance based on a position of the at least one vehicle and the image, upon detecting the generation source from the image reflecting the generation source, and
   the server provides the display information including the position of the generation source.

7. The information processing system according to claim 6, wherein
   the server acquires a wind direction at the generation source, and provides the display information including the position of the generation source and the wind direction.

8. The information processing system according to claim 1, wherein
   the server acquires a wind direction and wind speed, and
   the server determines a shape and a size of the floating substance presence area based on the wind direction and the wind speed.

9. The information processing system according to claim 1, wherein when the imaging position or the floating substance presence area displayed on the map is selected by a user, the corresponding floating substance information is displayed.

10. The information processing system according to claim 6, wherein when a generation source position or the floating substance presence area displayed on the map is selected by a user, a corresponding generation source type is displayed.

11. A non-transitory computer readable medium having instructions stored therein, which when executed by a processor in an information processing device that is mounted in a vehicle cause the processor to execute a method comprising:
    acquiring an image obtained by imaging a landscape outside the vehicle, a humidity outside the vehicle, and an imaging position of the image;
    generating floating substance information on an atmospheric floating substance around the vehicle, based on the image and the humidity; and
    transmitting the floating substance information and the imaging position to a server, wherein
    a floating substance presence area, based on the floating substance information and the imaging position, is superimposed and displayed on a map.

12. A non-transitory computer readable medium having instructions stored therein, which when executed by a processor in an information processing device that can communicate with at least one vehicle cause the processor to execute a method comprising:
    receiving, from the at least one vehicle, an image obtained by imaging a landscape outside the at least one vehicle, a humidity outside the at least one vehicle, and an imaging position of the image;
    generating floating substance information on an atmospheric floating substance around the at least one vehicle, based on the image and the humidity;
    storing at least one pair of the floating substance information and the imaging position corresponding thereto; and
    providing display information to a client, the display information including the at least one pair of the stored floating substance information and the stored imaging position corresponding thereto, wherein
    a floating substance presence area, based on the display information that includes the floating substance information and the imaging position, is superimposed and displayed on a map.

13. An information processing method that is carried out by an information processing system that is equipped with at least one vehicle and a server that can communicate with the at least one vehicle, the method comprising:
- the at least one vehicle acquiring an image obtained by imaging a landscape outside the at least one vehicle, a humidity outside the at least one vehicle, and an imaging position of the image;
- the at least one vehicle or the server generating floating substance information on an atmospheric floating substance around the at least one vehicle, based on the image and the humidity;
- the server storing at least one pair of the floating substance information and the imaging position corresponding thereto; and
- the server providing display information to a client, the display information including the at least one pair of the stored floating substance information and the stored imaging position corresponding thereto, wherein
- a floating substance presence area, based on the display information that includes the floating substance information and the imaging position, is superimposed and displayed on a map.

* * * * *